United States Patent
Hotaling et al.

(10) Patent No.: US 12,453,314 B2
(45) Date of Patent: Oct. 28, 2025

(54) FLOATING ROTOR AND AUGER ARRANGEMENT OF AGRICULTURAL BALER

(71) Applicant: CNH Industrial America LLC, New Holland, PA (US)

(72) Inventors: William Hotaling, New Holland, PA (US); John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 884 days.

(21) Appl. No.: 17/707,530

(22) Filed: Mar. 29, 2022

(65) Prior Publication Data

US 2023/0309456 A1     Oct. 5, 2023

(51) Int. Cl.
  *A01F 15/10* (2006.01)
  *A01D 89/00* (2006.01)

(52) U.S. Cl.
  CPC .......... *A01F 15/106* (2013.01); *A01D 89/002* (2013.01); *A01D 89/004* (2013.01)

(58) Field of Classification Search
  CPC .... A01F 15/106; A01D 89/002; A01D 89/004
  See application file for complete search history.

(56) References Cited

U.S. PATENT DOCUMENTS

| | | | |
|---|---|---|---|
| 2,757,602 A * | 8/1956 | Nolt | A01F 15/101 100/142 |
| 2,994,178 A * | 8/1961 | Hollyday | A01F 15/08 56/364 |
| 3,782,086 A * | 1/1974 | Anderson | A01D 89/004 56/13.3 |
| 3,798,885 A * | 3/1974 | Glass | A01F 15/08 56/364 |
| 4,187,666 A * | 2/1980 | McIlwain | A01D 89/004 56/364 |
| 5,916,116 A * | 6/1999 | Vande Ryse | A01D 89/004 56/341 |
| 6,279,304 B1 | 8/2001 | Anstey et al. | |
| 6,449,936 B1 | 9/2002 | Anstey et al. | |
| 6,877,304 B1 * | 4/2005 | Smith | A01F 15/106 56/364 |
| 7,617,662 B2 * | 11/2009 | Erdmann | A01D 89/008 56/364 |
| 8,056,314 B1 | 11/2011 | Anstey et al. | |
| 8,813,466 B2 | 8/2014 | Van De Weijer et al. | |
| 8,959,883 B2 | 2/2015 | McClure et al. | |
| 9,526,214 B2 * | 12/2016 | McClure | A01D 90/04 |

(Continued)

FOREIGN PATENT DOCUMENTS

| | | | | |
|---|---|---|---|---|
| DE | 2524434 A | * | 12/1975 | A01F 15/07 |
| DE | 4302199 A1 | * | 7/1994 | A01D 90/04 |

(Continued)

*Primary Examiner* — Arpad Fabian-Kovacs
(74) *Attorney, Agent, or Firm* — Buchanan Ingersoll & Rooney PC

(57) ABSTRACT

An agricultural baler includes: a frame; a feeder system coupled with the frame and including: a floor; and a rotor and auger arrangement configured for moving between a first position and a second position, the rotor and auger arrangement being spaced farther apart from the floor in the second position relative to the first position.

20 Claims, 5 Drawing Sheets

(56) References Cited

U.S. PATENT DOCUMENTS

| | | | | |
|---|---|---|---|---|
| 9,549,506 B2 * | 1/2017 | McClure | ............... | A01F 15/106 |
| 10,111,387 B1 * | 10/2018 | Derscheid | ............ | A01D 89/008 |
| 10,462,974 B2 * | 11/2019 | Schinstock | ............. | A01F 15/10 |
| 11,547,053 B2 * | 1/2023 | Lammerant | .......... | A01D 89/008 |

FOREIGN PATENT DOCUMENTS

| | | | | | |
|---|---|---|---|---|---|
| DE | 19534138 | C1 * | 10/1996 | ............. | A01D 90/04 |
| DE | 19841598 | B4 * | 4/2008 | ............. | A01D 90/04 |
| EP | 1163836 | A1 * | 12/2001 | ........... | A01D 90/02 |
| EP | 1430767 | A1 * | 6/2004 | ........... | A01F 15/106 |
| EP | 1595436 | A1 * | 11/2005 | ........... | A01F 15/106 |
| EP | 3275303 | A1 * | 1/2018 | ............. | A01D 90/04 |
| EP | 2883441 | B1 * | 11/2018 | ........... | A01D 89/002 |
| EP | 3666061 | A2 * | 6/2020 | ............. | A01F 15/10 |
| GB | 1229818 | A * | 4/1971 | ........... | A01D 89/002 |
| GB | 2059869 | A * | 4/1981 | ............. | A01F 15/04 |
| KR | 2015-0144112 | A | 12/2015 | | |
| WO | WO-2018109140 | A1 * | 6/2018 | ............. | A01D 78/04 |

* cited by examiner

FLOATING ROTOR AND AUGER ARRANGEMENT OF AGRICULTURAL BALER

FIELD OF THE INVENTION

The present invention pertains to an agricultural baler, and, more specifically, to a rotor and auger arrangement of the agricultural baler.

BACKGROUND OF THE INVENTION

Agricultural harvesting machines, such as agricultural balers (which can be referred to as balers), have been used to consolidate and package crop material (which can also be referred to as forage, forage material, or forage crop material) so as to facilitate the storage and handling of the crop material for later use. Often, a mower-conditioner cuts and conditions the crop material and forms it into a swath or windrow to dry in the sun. When the cut crop material is properly dried (depending upon the application), an agricultural harvesting machine, such as an agricultural baler, travels along the swath or windrows (hereinafter, collectively referred to as windrows, unless otherwise specified) to pick up the crop material. Agricultural balers can be, for example, round balers, large square balers, and small square balers, which form the bales into corresponding shapes, as is known.

More specifically, with respect to round balers, pickups of the baler gather the cut and windrowed crop material from the ground, and then convey the cut crop material toward a bale-forming chamber within the baler (that is, the bale chamber). A feeder system of the baler can include a pickup assembly and a rotor and auger arrangement. The pickup assembly includes a pickup. The rotor and auger arrangement includes a shaft that rotates, a plurality of rotors (which can be referred to as feeders) mounted to the shaft, and side augers mounted outboard of the rotors on the shaft. The pickup and the rotor and auger arrangement are driven to move crop material into the baler. A pickup can convey crop material in an overshot manner. Side augers move some of the crop material inward toward the center to the rotors. Rotors can convey crop material toward or into the bale chamber in an undershot manner. The feeder system can also include a floor and a cutting assembly. The floor can be disposed below the rotor and auger arrangement and can includes slots through which knives of the cutting assembly are selectively inserted in order to cut passing crop material being pushed along by rotors. A conventional bale chamber of a round baler may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. After wrapping, a cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

Occasionally, such as with round balers, the crop material can become plugged in the feeder system. That is, the crop material bunches up so as to form a plug of crop material (which can be referred to as a crop plug), which does not allow, or otherwise at least partially inhibits, the crop material from flowing from the feeder system into the bale chamber. The feeder system can thus become jammed. To facilitate removing or passing these plugs, the floor (mentioned above) of round balers prone to plugging can be a variable position (drop) floor. Such a floor can pivot downwards and upwards, while an axis of rotation of the shaft (the axis about which the shaft rotates) of the rotor and auger arrangement remains stationary, this downward pivot of the floor increasing a space between the floor and the rotors and allowing the plug to be removed or otherwise to pass through the feeder system into the bale chamber. While this system has been effective, improvements can be had.

What is needed in the art is an improved feeder system for allowing the removal or passage of a crop plug therein.

SUMMARY OF THE INVENTION

The present invention provides an agricultural baler with a feeder system including a rotor and auger arrangement which moves between first and second positions so as to create additional space and thereby allow for the removal or passing of a crop plug.

The invention in one form is directed to a feeder system of an agricultural baler, the feeder system being coupled with a frame of the agricultural baler, the feeder system including: a floor; and a rotor and auger arrangement configured for moving between a first position and a second position, the rotor and auger arrangement being spaced farther apart from the floor in the second position relative to the first position.

The invention in another form is directed to an agricultural baler includes: a frame; a feeder system coupled with the frame and including: a floor; and a rotor and auger arrangement configured for moving between a first position and a second position, the rotor and auger arrangement being spaced farther apart from the floor in the second position relative to the first position.

The invention in yet another form is directed to a method of using an agricultural baler, the method including the steps of: providing an agricultural baler including a frame and a feeder system coupled with the frame, the feeder system including a floor and a rotor and auger arrangement; and moving the rotor and auger arrangement between a first position and a second position, the rotor and auger arrangement being spaced farther apart from the floor in the second position relative to the first position.

An advantage of the present invention is that it provides translational movement of the rotor and auger arrangement, without the floor being required to move.

Another advantage is that the present invention provides for less complexity in the manufacturing plant for manufacturing the feeder system of a round baler.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
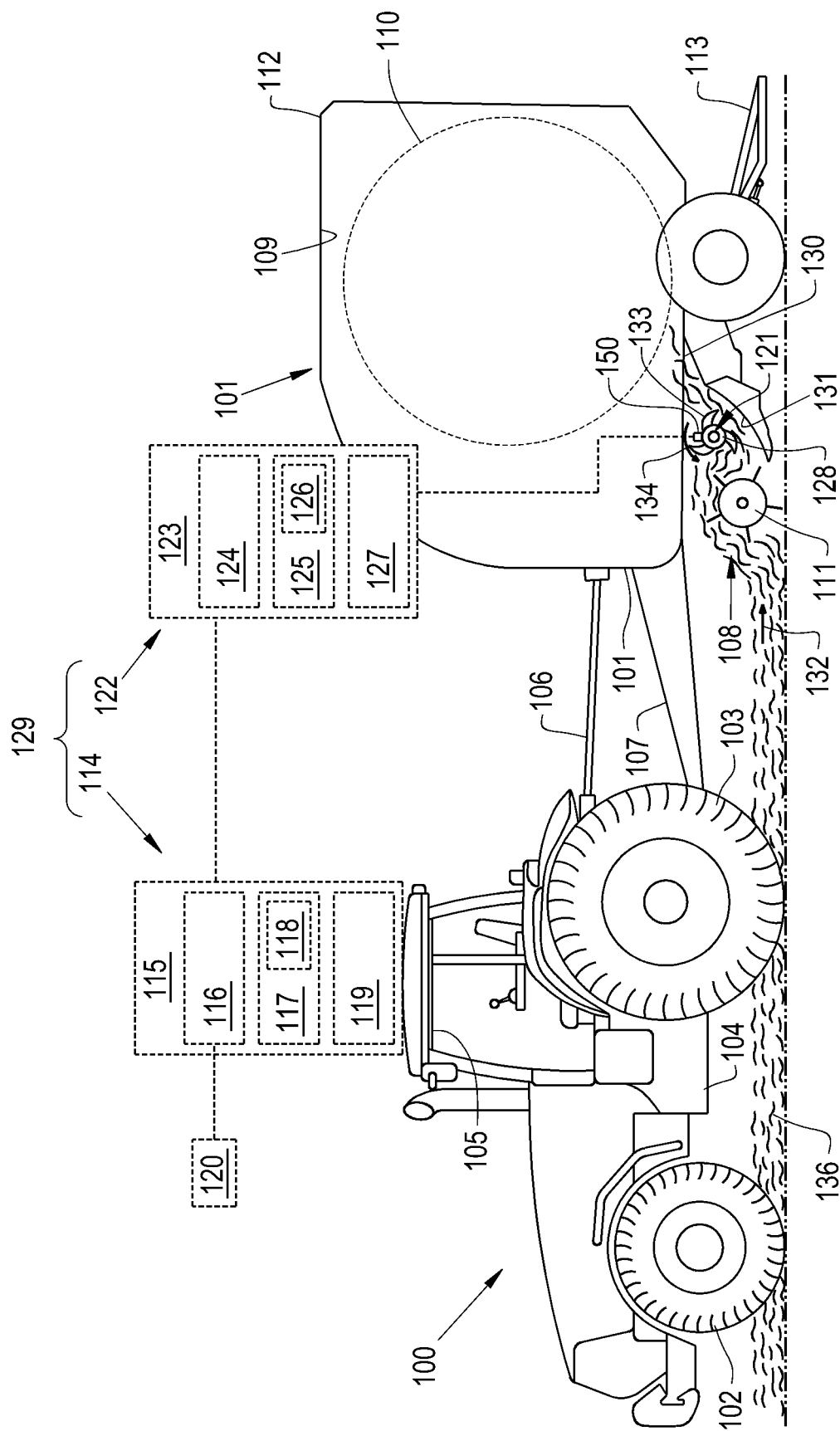
FIG. 1 illustrates a schematic side view of an exemplary embodiment of an agricultural vehicle, formed as a tractor, and an agricultural baler, the agricultural baler including a feeder system including a floor and a rotor and auger arrangement, in accordance with an exemplary embodiment of the present invention.

Referring now to the drawings, and more particularly to FIG. 1, there is shown an embodiment of an agricultural vehicle 100 (which can be referred to as a work vehicle 100) towing an agricultural baler 101 (any baler herein can be referred to as an agricultural machine), in accordance with the present invention, to perform a baling operation within a field (FIG. 1 is generic to all embodiments of the present invention discussed herein). As shown, work vehicle 100 can be configured as an agricultural tractor, such as an operator-driven tractor or an autonomous tractor. However, in some embodiments, work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales. However, in some embodiments, baler 101 may have any other suitable configuration, including being configured to generate square or rectangular bales. It should be further appreciated that baler 101, while shown as being towed by tractor 100, may also be a self-propelled baler that does not rely on a separate vehicle for propulsion and/or power to function. While the present invention is described with respect to a baler, it can be appreciated that other of the present invention can be used in conjunction with other agricultural machines, such as vehicles and/or implements, such as a self-loading forage wagon.

Work vehicle 100 includes a pair of front wheels 102, a pair of rear wheels 103, and a chassis 104 coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly.

As shown in FIG. 1, work vehicle 100 may be coupled to baler 101 via a power take-off (PTO) 106 and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system 108 (which can be referred to generally as a crop collector) mounted on a front end of baler 101. Feeder system 108 may, for example, include a pickup assembly 111, a rotor and auger arrangement 121, and a floor 131. Pickup assembly 111 includes a rotating wheel with tines that collect crop material 136 from the ground and direct crop material 136 toward a bale chamber 109 of baler 101 in an overshot manner (rotating clockwise in FIG. 1). Rotor and auger arrangement 121 includes a rotatable shaft 128, a plurality of rotor devices 133 (which can be referred to as rotors 133) fixedly mounted to shaft 128, and two side augers 235 (FIGS. 2-3, not shown in FIG. 1 for illustrative purposes) also fixedly mounted to shaft 128. Shaft 128, in normal operation, rotates about a transverse axis of rotation in a counter-clockwise manner (as seen in FIG. 1 and shown by arrow 134), with rotors 133 and augers 235 rotating in direction 134 together with shaft 128. Rotors 133, by this rotation, are configured to push or otherwise to move crop material 136 towards or into bale chamber 109, in an undershot manner. Side augers 235 are positioned on either outboard side of rotors 133 (FIGS. 2-3) and, by their fighting, are configured to move crop material 136 towards the center to rotors 133, so that crop material 136 can be conveyed onward into bale chamber 109 by rotors 133. FIG. 1 shows crop material 136 lying in a windrow on the ground of the field and being picked up by pickup assembly 111. Upon being picked up, crop material 136 flows over pickup assembly 111 and ultimately under rotor and auger arrangement 121, as indicated by arrow 132, which indicates the normal flow direction 132 of crop material 136 relative to feeder system 108. FIG. 1 shows baler 101 schematically and thus with one pair of wheels, though it can be appreciated that baler 101 can include one or more additional pair of wheels, as in FIG. 2.

Inside bale chamber 109, rollers, belts, and/or other devices compact the crop material 136 to form a generally cylindrically-shaped bale 110. Bale 110 is contained within baler 101 until ejection of bale 110 is instructed (e.g., by the operator and/or a baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes a control system 114, which includes a controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes a control system 122, which includes controller 123 and sensor 150 (shown schematically). Controller 123 includes a processor 124, memory 125, data 126, and instructions 127. Controller 123 can communicate with controller 115, so that controller 115 outputs information to the display of input/output device 120 of work vehicle 100, thereby informing a user of various conditions of baler 101 and bales 110 forming or formed therein. Further, baler 101 includes a frame 130 (which can be referred to as baler frame 130, or more generally as a machine frame 130) to which all of the components of baler 101 are directly or indirectly coupled. Thus, feeder system 108 and thus also pickup assembly 111 and rotor and auger arrangement 121 are coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration, or other agricultural machines, such as a vehicle and/or implement, such as a self-loading forage wagon. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Baler controller 123, herein, is assumed to be the primary controller for controlling operations of baler 101. However, controller 123 of baler 101, as indicated in FIG. 1, can be in communication with controller 115 of work vehicle 100, thereby forming a unified control system 129, such that any or all information associated with either controller 115, 123 can be shared with the other controller 115, 123, and either controller 115, 123 can perform the functions of the other controller 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Further, while not shown, both controllers 115, 123 can communicate with a remotely located data center (which can also be a part of unified control system 129), which controllers 115, 123 can communicate with by any suitable way, such as those just referenced. Such a data center can include its own controller (and thus processor(s), memory, data, and instructions, substantially similar to that described above with respect to controllers 115, 123) which can be configured to perform any of the functions associated with controllers 115, 123. Controllers 115, 123 and the data center can be a part of any network facilitating such communication therebetween, such as a local area network, a metropolitan area network, a wide area network, a neural network, whether wired or wireless.

Figure 2:
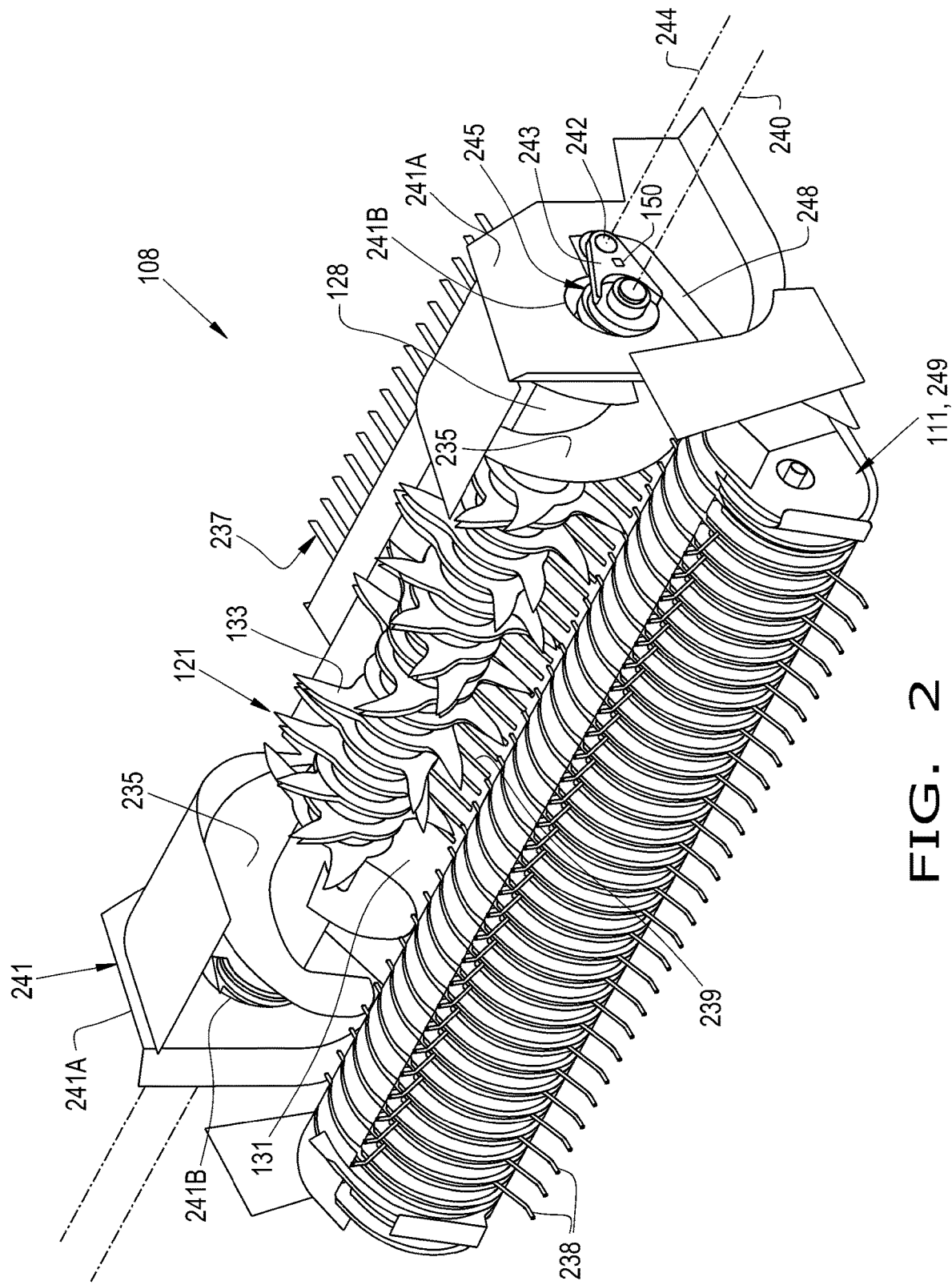
FIG. 2 illustrates a top, perspective view of the feeder system of the agricultural baler of FIG. 1, the feeder system including the floor and the rotor and auger arrangement, the rotor and auger arrangement being in the first position, in accordance with an exemplary embodiment of the present invention.

Referring now to FIG. 2, there is shown feeder system 108 including pickup assembly 111, floor 131, cutting assembly 237, rotor and auger arrangement 121, frame 241, two pivot connections 242, and two pivot arms 243. Pickup assembly 111 includes a plurality of tines 238 configured for picking up crop material 136 from the ground. Floor 131 defines a plurality of slots 239 each extending longitudinally and being spaced apart from one another in a transverse direction, slots 239 being configured for receiving therethrough individual knives of cutting assembly 237. In an exemplary embodiment of the present invention, floor 131 is fixed (such as with frame 241) and thus does not move up or down relative to rotor and auger arrangement 121 and frame 241 (instead, as disclosed below, rotor and auger arrangement 121 can move relative to floor 131 and frame 241. Cutting assembly 237 includes a plurality of knives which are configured for being inserted in slots 239 and for cutting crop material 136 to a predetermined size prior to crop material 136 entering bale chamber 109. As indicated, rotor and auger arrangement 121 includes shaft 128, rotors 133, and side augers 235 (which can be referred to as augers 235). Shaft 128 defines an axis of rotation 240 about which shaft 128 rotates, the rotation of shaft 128 causing rotors 133 and augers 235 to rotate with shaft 128 all in direction 134. Shaft 128 is coupled with pivot connections 242 at respective ends of shaft 128.

Frame 241 (which itself can be coupled with frame 130 of baler 101) includes side sheets 241A on each lateral end of shaft 128. Each side sheet 241A includes a through-hole 241B therein associated with a respective lateral end of shaft 128. Lateral ends of shaft 128 can include structure that couples with respective pivot arms 243, such structure of shaft 128 optionally extending through respective ones of holes 241B, being positioned therein, or being positioned laterally inward of holes 241B such that a connection is made with respective ones of pivot arms 243. Side sheets 241A can be made of any suitable material, such as steel, and can be formed in any suitable manner, such as metal forming, stamping, or the like.

Pivot connections 242 can be positioned generally to the rear of shaft 128, as shown in FIG. 2. Only one pivot connection 242 is shown in FIG. 2, though both pivot connections 242 are substantially similar to one another such that a description of one constitutes a description of the other, unless otherwise stated or shown. Pivot connections 242 are coupled with respective ones of side sheets 241A in any suitable manner and respective ones of pivot arms 243 in any suitable manner, and thus serve to connect side sheets 241A with pivot arms 243. Thus, pivot connection 242 can include any suitable way for enabling a respective pivot arm 243 to pivot relative to a respective side sheet 241A. For instance, pivot connection 242 can include a pin or shaft (hereinafter pin) and a bearing thereabout to allow pivot arm 243 to pivot about this pin. Pivot connections 242 define a pivot axis 244 that is spaced apart from rotational axis 240. Pivot connection 242 can also serve as a pivot for a pickup 249 of pickup assembly 111. Pivot arm 248 of pickup assembly 111 connects pickup 249 with pivot connection 242 so that pickup 249 can pivot about pivot axis 244 by way of, for example, the same pin of pivot connection 242. Pivot arm 248 can be positioned within a hole or cutout (not shown) of side sheet 241A so as to have freedom of movement to pivot up and down. Alternatively, pickup 249 of pickup assembly 111 can pivot about a different pivot axis than what rotor and auger arrangement 121 pivots about; that is, they both need not pivot about pivot axis 244 at pivot connection 242.

Pivot arms 243 are substantially similar to one another such that a description of one constitutes a description of the other, unless otherwise stated or shown. Pivot arm 243 couples pivot connection 242 with shaft 128, and, more broadly, couples side sheet 241A with shaft 128. More specifically, when pivot arm 243 couples with shaft 128, this coupling can be by way of a pin or interior rod or bar of shaft 128 together with a collar affixed about this pin/bar/shaft, with pivot shaft 243 optionally being able to pivot about this pin/bar/shaft by way of a bearing (this pin/bar/shaft and collar being visible in FIG. 2, rotational axis 240 proceeding from this pin/bar/shaft). Pivot arm 243 can be made of any suitable material and can be made in any suitable manner, such as by way of casting. Pivot arm 243 couples pivot connection 242 with shaft 128, with pivot arm 243 being coupled with shaft 128 in any suitable manner. Pivot arm 243 pivots about pivot axis 244 in both directions, such that shaft 128 is configured for pivoting about pivot axis 244 in both directions. Thus, because side sheet 241A is fixed relative to shaft 128 and because pivot arm 243 links shaft 128 to side sheet 241A, pivot arm 243 enables shaft 128 to pivot about pivot axis 244 in both directions within hole 241B.

Figure 4:
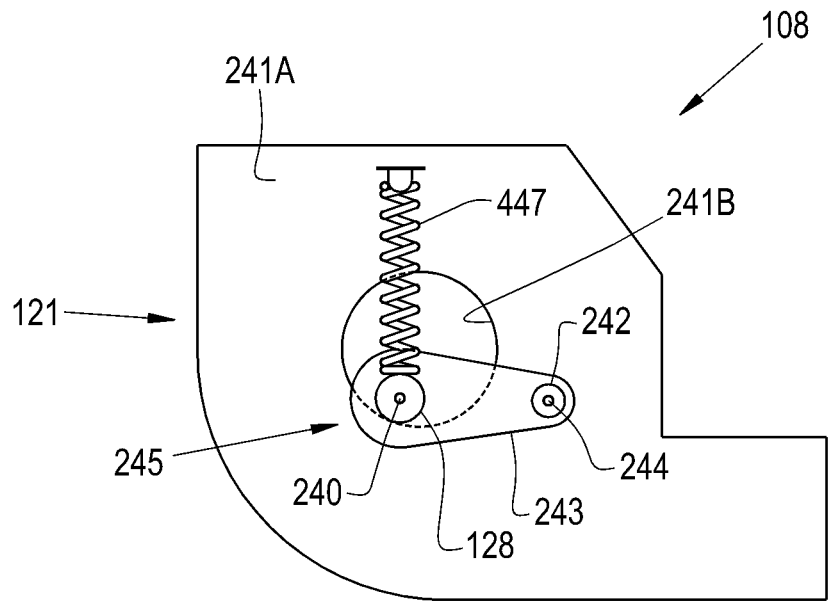
FIG. 4 illustrates a schematic side view of the feeder system of FIG. 2, the rotor and auger arrangement being in the first position, with portions broken away.
Figure 5:
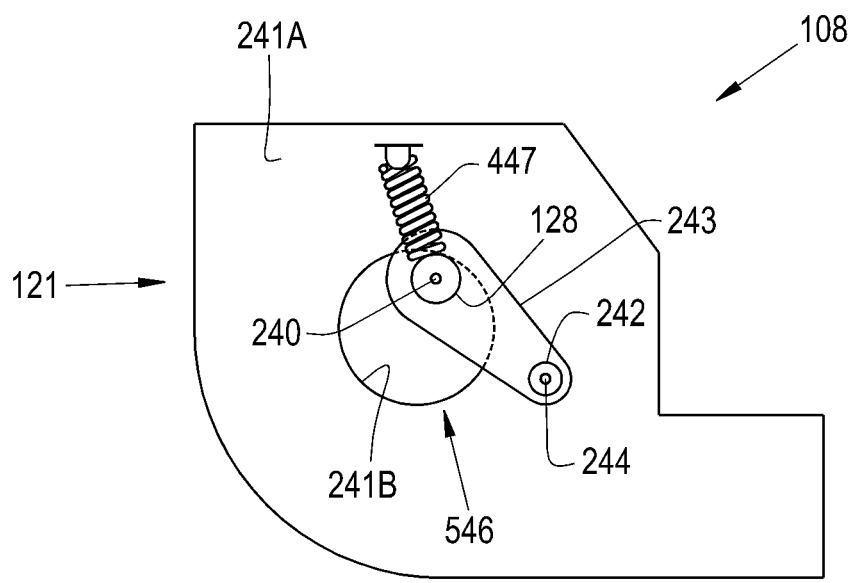
FIG. 5 illustrates a schematic side view of the feeder system of FIG. 2, the rotor and auger arrangement being in the second position, with portions broken away.
Figure 6:
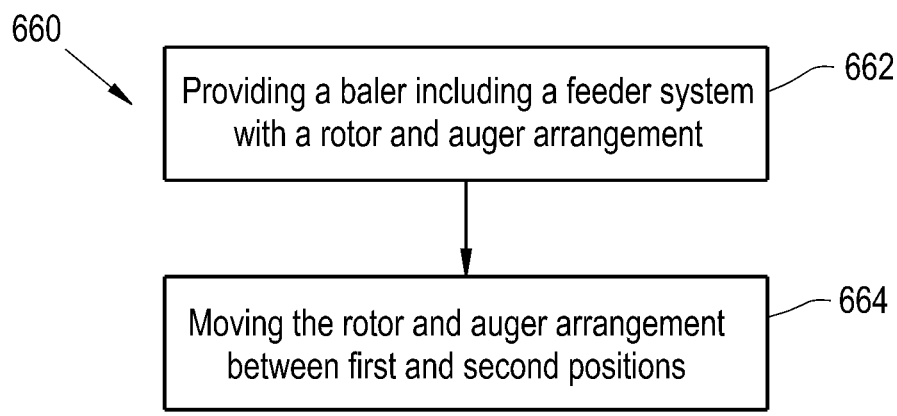
FIG. 6 illustrates a flow diagram showing a method of using an agricultural baler, in accordance with an exemplary embodiment of the present invention.

Because of the foregoing, rotor and auger arrangement 121 is configured for moving between a first position 245 and a second position 546 (FIG. 5). As shown in the figures, first position 245 can be a down position, and second position 546 can be an up position. Rotor and auger arrangement 121 is spaced farther apart from floor 131 in second position 546 relative to first position 245. Thus, shaft 128 is configured for floating between first position 245 and second position 546, these positions being the extremes of the range of movement, such that shaft 128 can also occupy non-discrete (infinite) positions between first and second positions 245, 546. Side sheets 241A can provide these boundaries for first and second positions 245, 546 by way of holes 241B (such that the portion of side sheets 241A defining holes 241B serves as stop mechanisms), or, alternatively, any other suitable stop mechanism can be provided to provide the boundaries of movement at first and second positions 245, 546. Further, this movement between these positions 245, 546 occurs by way of pivoting about pivot axis 244. That is, shaft 128 is configured for pivoting about pivot axis 244 between first position 245 and second position 546 by way of pivot connections 242 and pivot arm 243, and in so pivoting shaft 128 can undergo translational movement along a path of an arc. Shaft 128, by way of rotors 133 and/or augers 235, can float and thus rest on top of crop material 136 that is flowing through feeder system 108 (for example, under rotors 133). As the quantity of crop material 136 under rotor 133 and/or auger 235 increases, shaft 128 raises toward and as high as second position 546 allows. Conversely, as the quantity of crop material 136 under rotor 133 and/or auger 235 decreases, shaft 128 lowers toward and as low as first position 245 allows. Further, shaft is biased in first position 245 by a biasing mechanism 447 (for illustrative purposes, biasing mechanism 447 is not shown in FIG. 2, but is shown in FIGS. 4 and 5).

Sensor 150 serves to sense the position of rotor and auger arrangement 121—more specifically, shaft 128 and/or augers 235—in terms of being in first or second positions 245, 546 or in an intermediate position therebetween. Sensor 150 can be a plurality of sensors 150, though only one is shown in the figures. Sensor 150 can be positioned in any suitable location and function in any suitable manner. Sensor 150 can, for example, sense linear or angular displacement and can be a potentiometer or any suitable type of position sensor. Sensor 150, as shown in FIG. 2, can be positioned, for example, on or near pivot arm 243 (for example, on side sheet 241A) and be configured to detect the location of pivot arm 243 (for example, an angular position of pivot arm 243) and thereby deduce the position of rotor and auger arrangement 121 and/or detect the location of rotor and auger arrangement 121 directly. Thus, upon making this detection, sensor 150 can output and thus send a position signal, corresponding to the sensed position, to controllers 123, 115, and one of controllers 123, 115 can send a signal onward to output device 120 (which can be a display in operator's cab 105) to display to the operator of tractor 100 and baler 101 the position of rotor and auger arrangement 121. For instance, this could signal to operator that rotor and auger arrangement 121 is rising up from first position 245 and approaching second position 546, which would indicate to operator that the capacity of baler 101 is being approached rotor and auger arrangement 121 remains in this position for long periods of time. Further, temporary slugs of crop material 136 could proceed to go through rotor and auger arrangement 121 and thereby raise rotor and auger arrangement 121 temporarily, and not cause a plug or jam. In short, the indication to the operator of the position of rotor and auger arrangement 121 can enable the operator to operate baler 101 efficiently.

Figure 3:
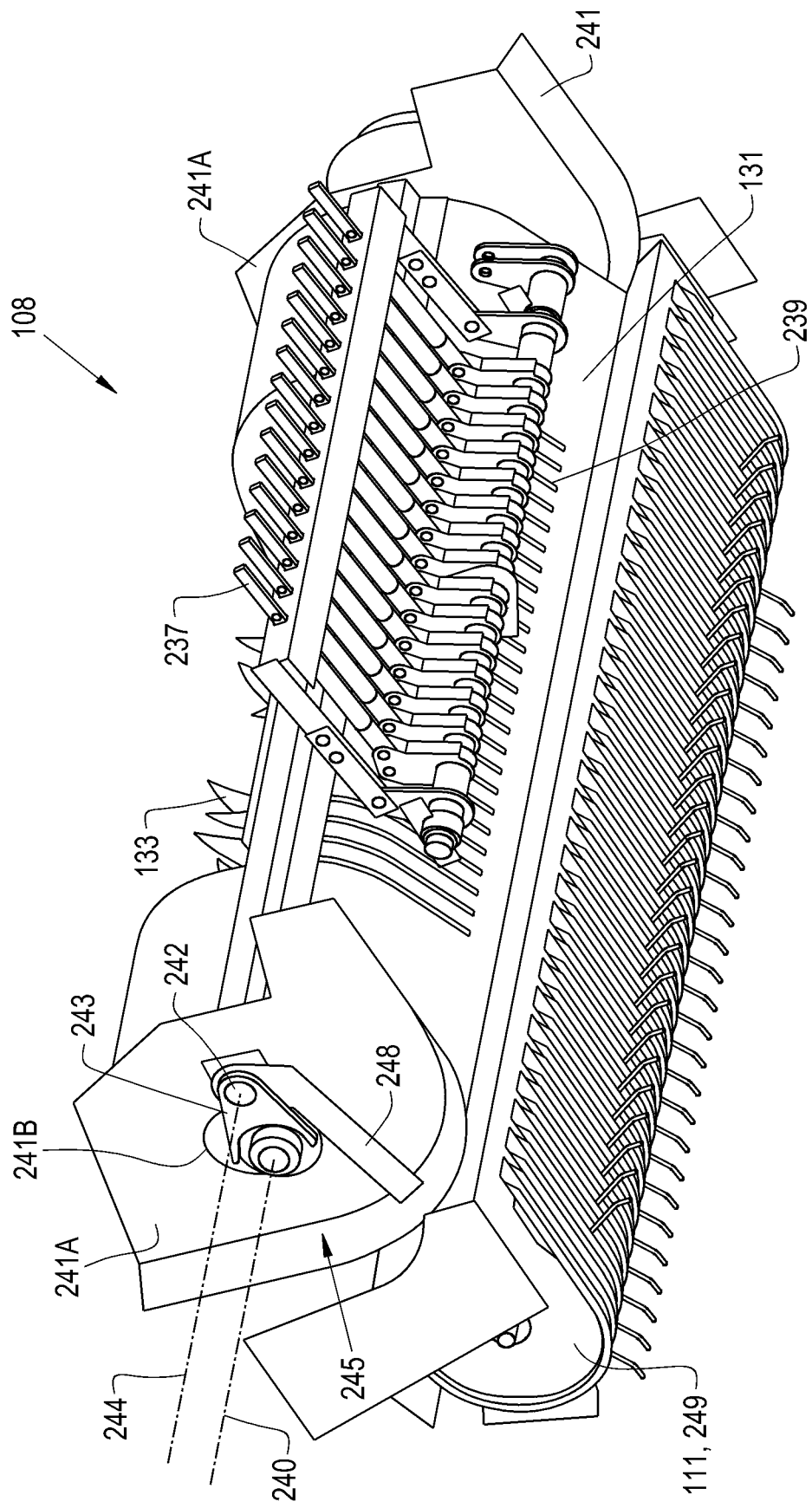
FIG. 3 illustrates a bottom, perspective view of the feeder system of FIG. 2, the rotor and auger arrangement being in the first position.

Referring now to FIG. 3, there is shown a bottom, perspective view of feeder system 108, with pickup assembly 111, floor 131, cutting assembly 237, rotor and auger arrangement 121, frame 241, and pivot connection 242. Rotor and auger arrangement 121 is shown in first position 245.

Referring now to FIG. 4, there is shown schematically a side view of feeder system 108, with portions broken away. Shaft 128 (more specifically, a portion thereof) is shown in first position 245 within hole 241B of side sheet 241A. Thus, pivot arm 243 is also in a down position. Further, feeder system 108 is shown to include biasing mechanism 447, which is formed as a compression spring 447. Spring 447 biases shaft 128 in first position 245 by pressing on shaft 128. Spring 447 can be coupled with side sheet 241A and shaft 128 in any suitable manner. Such a spring 447 biasing shaft 128 can be adapted from a similar design with respect to one or more spring-loaded feed rolls of a forage harvester. Alternatively, spring 447 can be coupled with pivot arm 243, rather than shaft 128. According to an alternative embodiment of the present invention, spring 447 can be attached to side sheet 241A below shaft 128, rather than above shaft 128 as shown in FIGS. 4 and 5; thus, spring would be a tension spring rather than a compression spring, still biasing shaft 128 in the first position 245 (down position).

Referring now to FIG. 5, there is shown schematically a side view of feeder system 108, with portions broken away. Shaft 128 (more specifically, a portion thereof) is shown in second position 546 (up position) within hole 241B of side sheet 241A, this being the primary difference between FIGS. 4 and 5. Thus, pivot arm 243 is also in a down position, and spring 447 is shown in FIG. 5 to be compressed compared to that in FIG. 4. Due to a larger quantity of crop material 136 (for example), rotor and auger arrangement 121 has moved to second position 546.

An additional advantage of the present invention is that it provides that the undershot design of rotor and auger arrangement 121 (as shown in the figures) could be used with the same pickup assembly (assembly 111) as used by a corresponding rotor and auger arrangement that employs an overshot design (not shown)(with an overshot design, the auger would rotate in a clockwise direction, and a cutting mechanism would not necessarily be used). This would increase commonality within the manufacturing plant, which would produce less complexity in the manufacturing plant.

Further, according to an alternative embodiment of the present invention, a floor (corresponding to floor 131) could be positioned above rotor and auger arrangement 121. Further, advantageously, the same drives for the undershot design of rotor and auger arrangement 121 and for an overshot design of a corresponding rotor and auger arrangement could be used.

In use, tractor 100 pulls baler 101 across the ground to harvest crop material 136 lying in windrows on the ground so as to bale crop material 136 in, for example, round bales. Pickup assembly 111, by way of tines 238, picks up crop material 136 in an overshot design. Crop material, after proceeding over pickup assembly 111, proceeds downstream to rotor and auger arrangement 121. Centered crop material 136 proceeds under rotor and auger arrangement 121 and encounters rotors 133 without needing to first encounter side augers 235. Crop material 136 that is not centered already but is more outboard encounters side augers 235 first, side augers 235, bk their flighting, and rotation move crop material 136 inward to rotors 133. Centered crop material 136 is then pushed by rotors 133 between rotor and auger arrangement 121 and floor 131 onward to bale chamber 109. When rotor and auger arrangement 121 encounters a relatively lesser amount of crop material 136, rotor and auger arrangement 121 can remain in first position 245 (given the downward biasing of biasing mechanism 447). When rotor and auger arrangement 121 encounters relatively more crop material 136, rotor and auger arrangement 121 moves up out of rotor and auger arrangement 121 by pivot arm 243 pivoting about pivot axis 244 by way of pivot connection 242, the crop material causing shaft 128 to overcome the biasing force of biasing mechanism 447. Depending upon how much more crop material 136 is encountered, rotor and auger arrangement can pivot and thus be displaced all the way to second position 546. In so moving, rotor and auger arrangement 121 floats on crop material 136. This creation of additional space between rotor and auger arrangement 121 and floor 131 (as rotor and auger arrangement 121 moves up/down while floor 131 remains stationary) enables the crop plug to be cleared, that is, to be removed or to pass between rotor and auger arrangement 121 and floor 131 onward to bale chamber 109.

Referring now to FIG. 7, there is shown a flow diagram showing a method 660 of using an agricultural baler 101, the method 660 including the steps of: providing 662 an agricultural baler 101 including a frame 131 and a feeder system 108 coupled with the frame 131, the feeder system 108 including a floor 131 and a rotor and auger arrangement 121; moving 664 the rotor and auger arrangement 121 between a first position 245 and a second position 546, the rotor and auger arrangement 121 being spaced farther apart from the floor 131 in the second position 546 relative to the first position 245. The rotor and auger arrangement 121 includes a shaft 128 which is configured for floating between the first position 245 and the second position 546. The feeder system 108 can further include a pivot connection 242, the shaft 128 defining an axis of rotation 240 and being coupled with the pivot connection 242 which defines a pivot axis 244 that is spaced apart from the axis of rotation 240, the shaft 128 being configured for pivoting about the pivot axis 244 between the first position 245 and the second position 546. The feeder system 108 can further include a pivot arm 243 coupling the pivot connection 242 with the shaft 128. The shaft 128 can be biased in the first position 245.

It is to be understood that the steps of method 660 may be performed by controller 115, 123 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123 described herein, such as the method 660, is implemented in software code or instructions which are tangibly stored on a tangible computer readable medium. The controller 115, 123 loads the software code or instructions via a direct interface with the computer readable medium or via a wired and/or wireless network. Upon loading and executing such software code or instructions by controller 115, 123, controller 115, 123 may perform any of the functionality of controller 115, 123 described herein, including any steps of the method 660.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A feeder system of an agricultural baler, the feeder system being coupled with a frame of the agricultural baler, the feeder system comprising:
   a floor; and
   a rotor and auger arrangement having a floating shaft that moves relative to the frame between a first position and a second position, the floating shaft of the rotor and auger arrangement being spaced farther apart from the floor in the second position relative to the first position.

2. The feeder system of claim 1, further including a pivot connection, the floating shaft defining an axis of rotation and being coupled with the pivot connection which defines a pivot axis that is spaced apart from the axis of rotation, the floating shaft being configured for pivoting about the pivot axis between the first position and the second position.

3. The feeder system of claim 2, further including a pivot arm coupling the pivot connection with the floating shaft, wherein one end of the pivot arm is pivotably connected to the frame and another end of the pivot arm is connected to the floating shaft.

4. The feeder system of claim 3, wherein the floating shaft is biased in the first position.

5. The feeder system of claim 1, wherein the feeder system further comprises side walls extending from the floor, wherein at least one of the side walls includes an opening through which the floating shaft partially extends, wherein movement of the floating shaft is constrained by a perimeter of the opening.

6. The feeder system of claim 1 further comprising a biasing mechanism having one end that is mounted to the floating shaft, wherein the biasing mechanism biases the floating shaft toward the first position, and the floating shaft moves toward the second position against a bias of the biasing mechanism as crop accumulates between the floor and the rotor and auger arrangement.

7. The feeder system of claim 2, further comprising a pickup shaft that is parallel to and spaced apart from the axis of rotation of the floating shaft, wherein the pickup shaft pivots about the pivot axis.

8. An agricultural baler, comprising:
   a frame;
   a feeder system coupled with the frame and including:
      a floor; and
      a rotor and auger arrangement having a floating shaft that moves relative to the frame between a first position and a second position, the floating shaft of the rotor and auger arrangement being spaced farther apart from the floor in the second position relative to the first position.

9. The agricultural baler of claim 8, wherein the feeder system further includes a pivot connection, the floating shaft defining an axis of rotation and being coupled with the pivot connection which defines a pivot axis that is spaced apart from the axis of rotation, the floating shaft being configured for pivoting about the pivot axis between the first position and the second position.

10. The agricultural baler of claim 9, wherein the feeder system further includes a pivot arm coupling the pivot connection with the floating shaft.

11. The agricultural baler of claim 10, wherein the floating shaft is biased in the first position.

12. The agricultural baler of claim 8, wherein the feeder system further comprises side walls extending from the floor, wherein at least one of the side walls includes an opening through which the floating shaft partially extends, wherein movement of the floating shaft is constrained by a perimeter of the opening.

13. The agricultural baler of claim 8 further comprising a biasing mechanism having one end that is mounted to the floating shaft, wherein the biasing mechanism biases the floating shaft toward the first position, and the floating shaft moves toward the second position against a bias of the biasing mechanism as crop accumulates between the floor and the rotor and auger arrangement.

14. The agricultural baler of claim 9, further comprising a pickup shaft that is parallel to and spaced apart from the axis of rotation of the floating shaft, wherein the pickup shaft pivots about the pivot axis.

15. A method of using an agricultural baler, the method comprising the steps of:
   providing an agricultural baler including a frame and a feeder system coupled with the frame, the feeder system including a floor and a rotor and auger arrangement; and
   moving a floating shaft of the rotor and auger arrangement relative to the frame between a first position and a second position, the floating shaft of the rotor and auger arrangement being spaced farther apart from the floor in the second position relative to the first position.

16. The method of claim 15, wherein the feeder system further includes a pivot connection, the floating shaft defining an axis of rotation and being coupled with the pivot connection which defines a pivot axis that is spaced apart from the axis of rotation, the floating shaft being configured for pivoting about the pivot axis between the first position and the second position.

17. The method of claim 16, wherein the feeder system further includes a pivot arm coupling the pivot connection with the floating shaft.

18. The method of claim 15, wherein the feeder system further comprises side walls extending from the floor, wherein at least one of the side walls includes an opening through which the floating shaft partially extends, wherein movement of the floating shaft is constrained by a perimeter of the opening.

19. The method of claim 15, wherein the feeder system further comprises a biasing mechanism having one end that is mounted to the floating shaft, wherein the biasing mechanism biases the floating shaft toward the first position, and the floating shaft moves toward the second position against a bias of the biasing mechanism as crop accumulates between the floor and the rotor and auger arrangement.

20. The method of claim 16, wherein the feeder system further comprises a pickup shaft that is parallel to and spaced apart from the axis of rotation of the floating shaft, wherein the pickup shaft pivots about the pivot axis.

* * * * *